(12) United States Patent
Schneider

(10) Patent No.: US 8,775,818 B2
(45) Date of Patent: *Jul. 8, 2014

(54) MULTIFACTOR VALIDATION OF REQUESTS TO THWART DYNAMIC CROSS-SITE ATTACKS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 390 days.

This patent is subject to a terminal disclaimer.

(21) Appl. No.: 12/628,121

(22) Filed: Nov. 30, 2009

(65) Prior Publication Data

US 2011/0131416 A1 Jun. 2, 2011

(51) Int. Cl.
*H04L 29/06* (2006.01)

(52) U.S. Cl.
USPC ........... 713/181; 713/170; 713/172; 713/176; 713/178; 713/182; 726/1; 726/2; 726/4; 726/5; 726/10; 726/21; 726/26; 726/27; 726/30; 709/217; 709/219; 709/225; 709/226; 709/229

(58) Field of Classification Search
USPC ............. 726/1–10, 26–30, 21; 713/170–185; 709/217–237
See application file for complete search history.

(56) References Cited

U.S. PATENT DOCUMENTS

| | | | |
|---|---|---|---|
| 6,105,012 A * | 8/2000 | Chang et al. | 705/64 |
| 6,505,300 B2 | 1/2003 | Chan et al. | |
| 7,454,622 B2 | 11/2008 | Laidlaw et al. | |
| 7,478,434 B1 * | 1/2009 | Hinton et al. | 726/27 |
| 7,500,099 B1 * | 3/2009 | McElwee et al. | 713/168 |
| 7,565,135 B2 | 7/2009 | Patel | |
| 8,264,721 B2 | 9/2012 | Oomura et al. | |
| 2002/0099936 A1 * | 7/2002 | Kou et al. | 713/151 |
| 2003/0182549 A1 | 9/2003 | Hallin et al. | |
| 2005/0050364 A1 * | 3/2005 | Feng | 713/201 |
| 2005/0183142 A1 | 8/2005 | Podanoffsky' | |
| 2007/0143614 A1 | 6/2007 | Holtmanns | |
| 2008/0028447 A1 | 1/2008 | O'Malley et al. | |
| 2008/0082602 A1 | 4/2008 | Morikawa | |
| 2008/0083032 A1 | 4/2008 | Yamaoka | |
| 2008/0115201 A1 * | 5/2008 | Sturms et al. | 726/9 |
| 2008/0222736 A1 * | 9/2008 | Boodaei et al. | 726/27 |
| 2008/0263650 A1 | 10/2008 | Kerschbaum | |

(Continued)

OTHER PUBLICATIONS

Handbook of Applied Cryptography by Menezes et al; Publisher: CRC Press LLC; Year: 1997.*

(Continued)

*Primary Examiner* — Madhuri Herzog
(74) *Attorney, Agent, or Firm* — Lowenstein Sandler LLP

(57) ABSTRACT

An apparatus and a method for validating requests to thwart cross-site attacks is described. A user identifier token, a request identifier token, and a timestamp, are generated at a web application of a server. A Message Authentication Code (MAC) value is formed based on the user identifier token, the request identifier token, and the timestamp using a secret key of the web application. Names of the form elements are enciphered. Fake form elements can also be added to the dynamic form. The entire page also can be enciphered. The dynamic form is sent with the MAC value and the time stamp to a client. A completed form comprising a returned MAC value and a returned timestamp is received from the client. The completed form is validated at the server based on the returned MAC value and the returned timestamp.

20 Claims, 6 Drawing Sheets

(56) References Cited

U.S. PATENT DOCUMENTS

| | | | |
|---|---|---|---|
| 2008/0320567 | A1 | 12/2008 | Shulman et al. |
| 2009/0144546 | A1* | 6/2009 | Jancula et al. ............... 713/168 |
| 2010/0088752 | A1* | 4/2010 | Nagulakonda et al. ........... 726/6 |
| 2010/0088761 | A1 | 4/2010 | Podjarny et al. |
| 2010/0299732 | A1* | 11/2010 | Zhang et al. ...................... 726/6 |
| 2011/0055391 | A1 | 3/2011 | Schneider |
| 2011/0131635 | A1 | 6/2011 | Schneider |

OTHER PUBLICATIONS

Secure Web Forms with Client-Side Signatures by Honkala et al; Publisher: Springer-Verlag Berlin Heidelberg; Year: 2005.*

Jesse Burns, Cross Site Request Forgery, An Introduction to a Common Web Application Weakness, © 2005, 2007, Information Security Partners, LLC. https://www.isecpartners.com/, 9 pages.

Red Hat Office Action for U.S. Appl. No. 12/627,864, mailed Feb. 6, 2012.

Red Hat Office Action for U.S. Appl. No. 12/551,352, mailed May 4, 2012.

Red Hat Office Action for U.S. Appl. No. 12/627,864, mailed Jul. 13, 2012.

Red Hat Office Action for U.S. Appl. No. 12/551,352, mailed Dec. 5, 2012.

Red Hat Office Action for U.S. Appl. No. 12/551,352, mailed May 20, 2013.

Red Hat Office Action for U.S. Appl. No. 12/627,864, mailed Apr. 16, 2013.

Red Hat Advisory Action for U.S. Appl. No. 12/627,864, mailed Sep. 26, 2012.

* cited by examiner

MULTIFACTOR VALIDATION OF REQUESTS TO THWART DYNAMIC CROSS-SITE ATTACKS

TECHNICAL FIELD

Embodiments of the present invention relate to computing systems, and more particularly, to web application weaknesses.

BACKGROUND

Cross-Site Request Forgery (XSRF) are a class of serious vulnerabilities that exist in nearly every web application ever deployed. The basic problem is that it is possible for an attacker to host a page with a carefully crafted form that directs a target web application to do anything it could otherwise do, and then trick an authorized user of the web application into submitting the form. For example, the form could submit a request to a bank to transfer money from the victim's account to the attacker's account.

When executed properly, an attack is virtually undetectable—the victim does not see any evidence of it in their browser window, and in the logs of the vulnerable web application, it looks entirely like a completely intentional transaction. Victims will not even be able to prove that they are victims. By destroying the trust required for commerce to function, it is possible that this problem will completely undermine web commerce.

This problem exists because of a security context mismatch—web applications assume that a token that proves identity can also be used to prove intent. This vulnerability is implicit in the way browsers operate, and it is made worse by scripting languages embedded in the browser.

While a client side could be instituted, this is not scalable—it would require that every vulnerable browser (which is to say, every browser currently installed) be replaced.

A server side fix is a better option. However, this would still require substantial modification to vulnerable web applications. This technique provides a framework for these modifications, with an eye to making them less obtrusive and easier to integrate.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for validating requests to thwart dynamic cross-site attacks. A user identifier token, a request identifier token, and a timestamp, are generated at a web application of a server. A Message Authentication Code (MAC) value is formed based on the user identifier token, the request identifier token, and the timestamp using a secret key of the web application. Names of the form elements are enciphered. Fake form elements can also be added to the form. The entire page also can be enciphered. The form is sent with the MAC value and the time stamp to a client. A completed form comprising a returned MAC value and a returned timestamp is received from the client. The completed form is validated at the server based on the returned MAC value and the returned timestamp.

Figure 1:
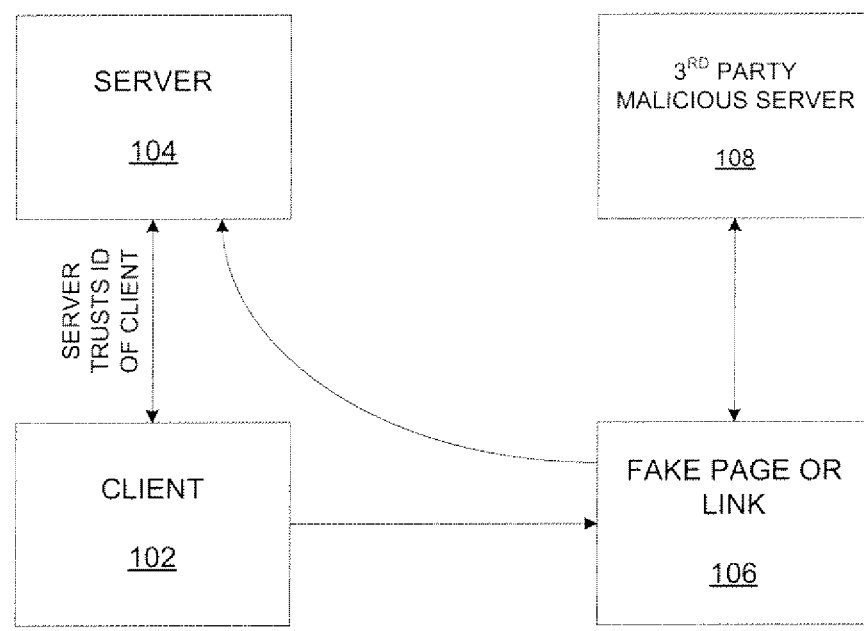
FIG. 1 is a block diagram illustrating a system experiencing a dynamic cross-site request forgery attack.

FIG. 1 is a block diagram illustrating a system experiencing a cross-site request forgery attack (XSRF). The attack works by including a link or script in a page that accesses a site to which the user is known (or is supposed) to have authenticated. For example, a user at client 102 might be browsing a chat forum where a malicious user (on $3^{rd}$ party malicious server 108) has posted a message.

The attacker can request a form-bearing page from a vulnerable site, parse it, construct an appropriate (but fraudulent) form submission, and submit the fraudulent form. All of this can be accomplished in the background, without the knowledge of the victim. The only requirement would be that the victim visits the vulnerable page 106.

For example, a vulnerable online banking application may have three elements in a form to link another account for online withdrawals—the bank name, the account number, and the routing number. An attacker can create a page with a hidden <iframe> element, and JavaScript that causes the victim's browser to request the vulnerable form into that <iframe>.

Next, the attacker's JavaScript requests the form from the document object associated with that <iframe>, extracts all of the element names (including hidden element names), and finally constructs and submits a form. While this is going on, the user is oblivious to the process.

In other words, a cross-site request forgery is a confused deputy attack against a web browser at client 102. The deputy in the above example is the user's web browser which is confused into misusing the user's authority at the direction of malicious user at server 108.

Common characteristics to XSRF are:
sites that rely on a user's identity;
exploiting the site's trust in that identity;
tricking the user's browser into sending HTTP requests to a target site; and
involving HTTP requests that have side effects.

At risk are web applications that perform actions based on input from trusted and authenticated users without requiring the user to authorize the specific action. As illustrated above, a user at client 102 that is authenticated by a cookie saved in his web browser could unknowingly send an HTTP request to a site (server 104) that trusts him and thereby cause an unwanted action.

Figure 2:
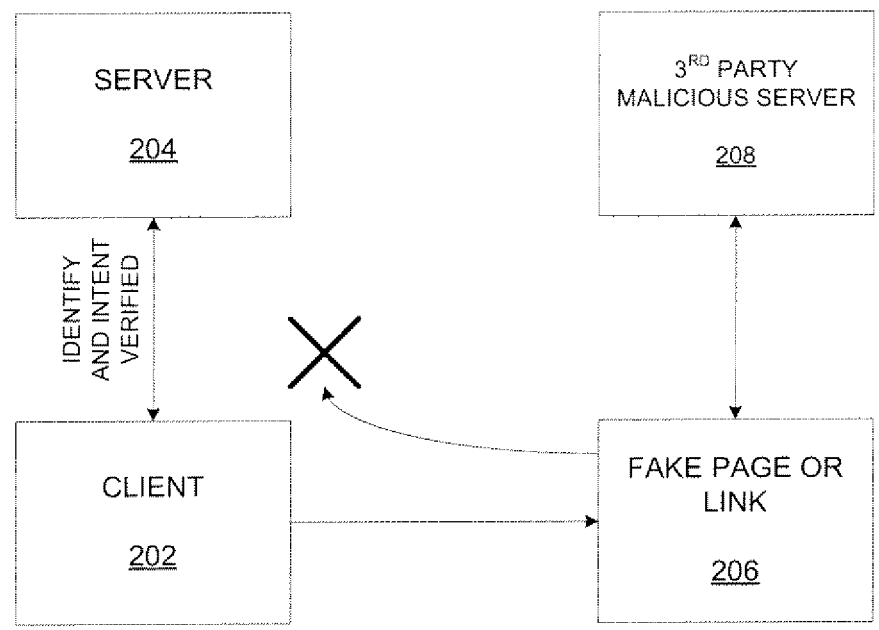
FIG. 2 is a block diagram illustrating one embodiment of a system for preventing dynamic cross-site request forgery attacks.

FIG. 2 is a block diagram illustrating one embodiment of a system for preventing cross-site request forgery attacks. Following a similar example of FIG. 1, a user at client 202 is browsing a chat forum where a malicious user (on $3^{rd}$ party malicious server 208) has posted a message. The malicious user has crafted an HTML image element 206 that references a script on the user's bank website (web application of bank server 204).

However, in that case, multifactor validation of the cross-site request are performed at server 204 to verify and validate the identity of the user submitting the request, and the intentional action of the user submitting the request. In one embodiment, such validation factors include several layers of strategies to impose on an attacker. A first layer includes enciphering the names of form elements. A second layer includes adding fake form elements that do not actually get displayed. A third layer includes enciphering the entire page, and providing a JavaScript program that will decipher the page and display it.

The validation factors can also include two identity tokens and a timestamp to authenticate that a request does in fact represent the intentional action of the user. These three tokens are concatenated, and the resulting string is run through a Message Authentication Code, using a web application secret key. This MAC value is then associated with the request in the web browser of client 202, and only requests with this MAC are considered intentional.

The first identity token identifies the user of the application. This could either be their user name, or a session token identifier. Using a session token is likely to result in better performance (since the user name/account identifier wouldn't need to be looked up during the validation phase). It also increases the difficulty of a brute force attack by increasing the number and range of variables in the MAC computation. If the session identifier is controlled by the web application, it may (or may not) make chosen plaintext attacks against the MAC algorithm impossible.

The second identity token identifies the request itself. It can be a URL, a request type and account number, or anything else that can be uniquely and unambiguously associated with a particular requested action. It can either be implicit in the request itself, or maintained as a mapping table on the server.

The timestamp identifies the window of time in which the action is valid. This can either be the time at which the MAC is computed, or the last valid time for the action. The timestamp is used to limit vulnerability to replay attacks.

With respect to the first layer, the names of form elements are enciphered, and only deciphered for the content handler if the form validates using the above tokens. This makes it more difficult for an attacker because they can no longer rely on the name of form elements. However, if the form layout is static (and most forms are), this is still vulnerable, because the attacker can still gather the form element names, and deduce which form element has which usage. Further, if the number of form elements is small, the script can just construct forms using every possible ordering. Going back to the hypothetically vulnerable banking application, let's say the input element names were originally "bankname", "account", "routing", and the attacker wants to provide the values "Evil Bancorp", "12345", and "123456789", respectively. The attack could rely on the ordering of those elements being static within the form, and it would just stick the appropriate exploit values in the appropriate places, or it could just construct and submit six different forms, with the appropriate ordering.

With respect to the second layer, fake form elements that do not actually get displayed are added. This can be accomplished by adding style rules to the page that make the elements invisible, or position them off of the page. This makes the attacker's job significantly harder, because they have to figure out which form element is used for what purpose. The only way to effectively defeat this is to either try to find out which elements are invisible (leaving the set of visible elements) and perform a positional analysis of the remainder, or parse the page for adjacent text and form element labels to determine which elements are "important". The text analysis attack can be made more difficult by duplicating labels and other text within the form in page elements that don't get displayed. However, a sophisticated attacker will be able to determine which form elements are actually displayed by examining the properties of the form element and its parent entities (for example, an attacker can recognize that an <input> element within a <div> element that's positioned off the visible page is not visible by looking at the parent of the <input> element and looking at its properties).

The third layer is enciphering the entire page, and providing a JavaScript program that will decipher the page and display it. This can be hardened by making the decipherment function refuse to work if the page is loaded into a <frame> or <iframe>. However, a sophisticated attacker could examine the decipherment function and implement it within their own exploit code.

All of these layers require both server and client resources to implement. They are also designed to be applied sequentially (for instance, it does not make sense to add several fake form elements if the names of the original form elements are not disguised). None of them guarantee that a successful exploit will not occur. But they do make an exploit harder, and the additional processing time required (particularly for the third layer, especially if it is combined with pre-encipherment compression) make it at least possible for an alert user to notice.

Figure 3:
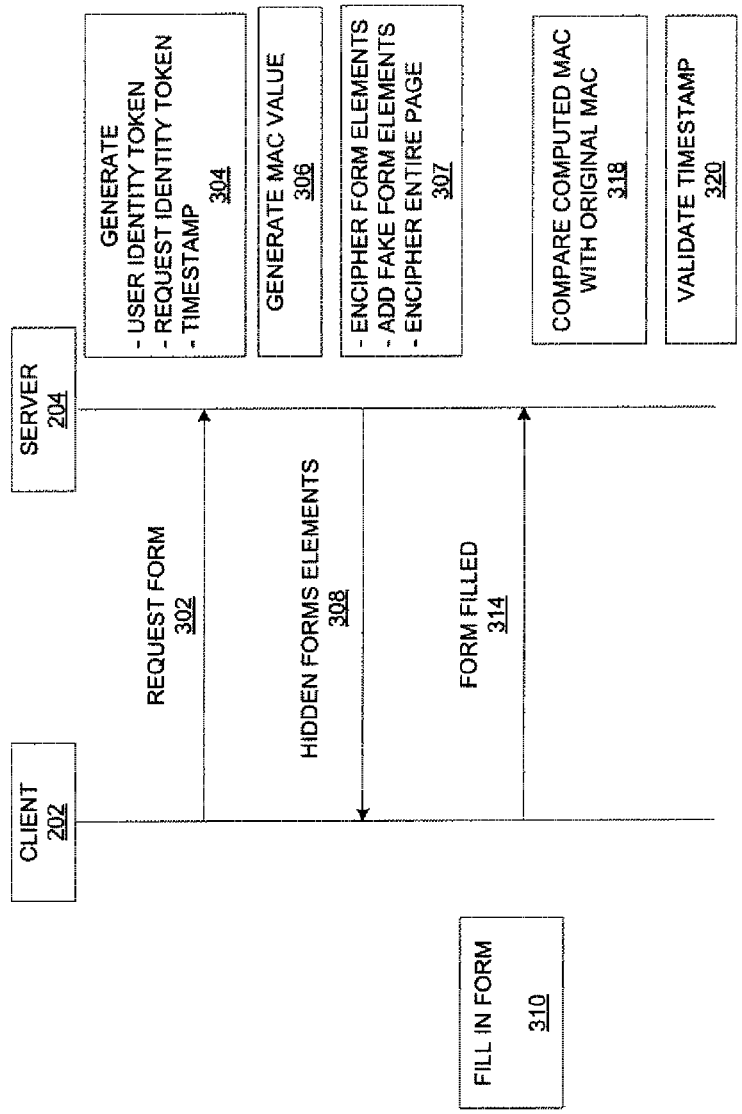
FIG. 3 is a ladder diagram illustrating one embodiment of a system for preventing dynamic cross-site request forgery attacks.

FIG. 3 is a ladder diagram illustrating one embodiment of a system for preventing cross-site request forgery attacks between client 202 and server 204. Client 202 submits a request for a form or action 302 to server 204. Server 204 generates a user identifier token, a request identifier token, and a timestamp token at 304. The web application at server 204 calculates the MAC value for each, and adds it to the action request, along with the timestamp.

In one embodiment, the MAC and timestamp could be represented in some self-delimiting, unambiguous form, and then transport coded, or they could be represented separately (for example, a 160 bit MAC and 32 bit timestamp could just be concatenated and base-64 encoded). The encoded value is then represented as a hidden input field in a form 308, or part of the action request URL.

The previously described layers can also be used to prevent dynamic cross-site requests. As such, at 307, names of forms elements can be enciphered. Fake form elements can be formed and added as follows:

To encipher a name, it is embedded within a delimited string of an arbitrary minimum size, padding short names to make them the correct length. The padded name is then enciphered. The result of the encipherment is then base-64 transcoded.

For fake names, strings of random characters of the appropriate length are used. In one embodiment, they do not start with the delimiter used for the embedding string of the legitimate form names. The strings of random character is then enciphered and base-64 transcoded.

For instance, a form with input elements with names "username" and "password" could be protected like this:

1) Embed the names into 48 character strings, using the delimiters %! and !%:

%!username!/%o81wvhFVZxVDdLU1+vOnojN+WYRJr40CsZ4h

%!password!%B9VO6JiL5rAM7JxT00XisNg/mcuI+3+/QmeS

2) Encipher and base-64 encode:
wzhB10e49ffN2PoeJKC/OrkN7LDH
+RoYOaFhSU8RrJbD/AFLeEuzq4ICV66Ex38U
XKKLNVznBMhedaJIbgXe2DnhmPzeSl1KwdILGRai/
ApTvvaKqLK +y2rNN9vDb85e To get around possible issues with the + and / characters, the characters − and _ may be substituted:

wzhB10e49ffN2PoeJKC_OrkN7LDH-RoYOaFhSU8Rr-JbD_AFLeEuzq4ICV66Ex38U

XKKLNVznBMhedaJIbgXe2DnhmPzeSl1KwdILGRai_ApTvvaKqLK- y2rNN9vDb85e

Now, to add fake values, random strings of characters are generated with 48 characters long that do not start with the delimiter. They are then enciphered and base-64 transcoded as follows:

4Y1fgv2MRSV7e+Y83nqL36WkHd1c59Ew3Iang0F384Wf6av5=>necSK5PB0815LHc6OWnTe3N4zMX6TkY6m-8cZBzc0sL3YbdjkKckMIajnhXpHvCwZ 3z+dpA/v6T5bYhrSil9nNjQAj7kptwEBrZ+E3rApxfY marqa=>19J3vVHaA4c80Tv_11rh2K6e092NXWML1_IhA_Smi4kBvnMMlmrT3NTH_xMPLI63

The protection layer can unambiguously determine which form elements to discard by performing the decipherment operation, and attempting to parse out the delimited form element names.

The entire page can subsequently be enciphered.

The user at web browser of client 202 fills in the form at 310 and submits the filled form 314 to server 204. Filled form 314 could either be a legitimate request or a malicious non-intentional request from client 202.

Validating that an action is intentional would have the following series of steps:
1) If the MAC value isn't provided by the browser, fail here.
2) Assemble the required parts of the MAC and perform the MAC calculation (318). If the computed MAC doesn't match the browser-provided MAC, fail here.
3) Validate that the timestamp (320) is still valid, or fail.

This could be integrated into web applications. Or, alternately, it could be implemented in an active proxy layer. The proxy layer would inject the required bits into the HTML of pages it serves, validate return requests, and strip out the components it injected.

The proxy solution can be accomplished using different techniques. In one embodiment, it is accomplished by a simple pair of Apache HTTPD filters, together with appropriate configuration.

The timestamp mitigates the possibility of replay attacks, but it does not eliminate the possibility. Elimination could be accomplished by adding a nonce to both the action and the MAC computation, and tracking the nonces that have been issued, and those that have been used. The timestamp should still be used to prevent after-the-fact actions.

An aggressive replay attack prevention technique would be to only track a single nonce per session ID, and require that an action use the current nonce, issuing a new nonce every time a new page is generated. This would have the effect of breaking the back button on the browser, but it would guarantee that cache mining (an attack that is based on examining the user's browser cache for sensitive information that can be used for later attacks) could only yield a single attack. With a short timeout period, even that would be questionable.

Figure 4:
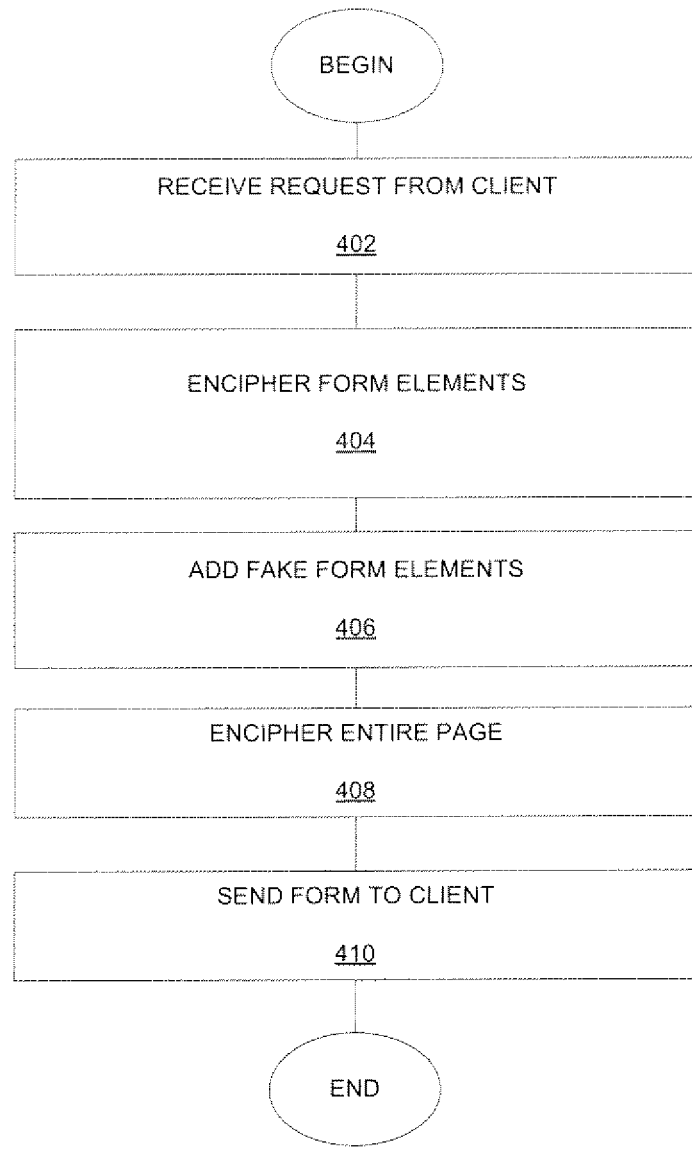
FIG. 4 is a flow diagram illustrating one embodiment of a method for preventing dynamic cross-site request forgery attacks at a server.

FIG. 4 is a flow diagram illustrating one embodiment of a method for preventing cross-site request forgery attacks. At 402, a web application of a server receives a request from a client. The server generates a user identifier token, a request identifier token, and a timestamp in response to the request. The server forms a Message Authentication Code (MAC) value based on the user identifier token, the request identifier token, and the timestamp using a secret key of the web application.

At 404, the server can encipher names of form elements and only deciphering them for the content handler if the form validates. At 406, fake form elements that do not get displayed can be added. At 408, the entire page can be enciphered. A JavaScript program can be provided to decipher the page and display it.

At 410, the server sends the form with the MAC value and the time stamp to the client.

Figure 5:
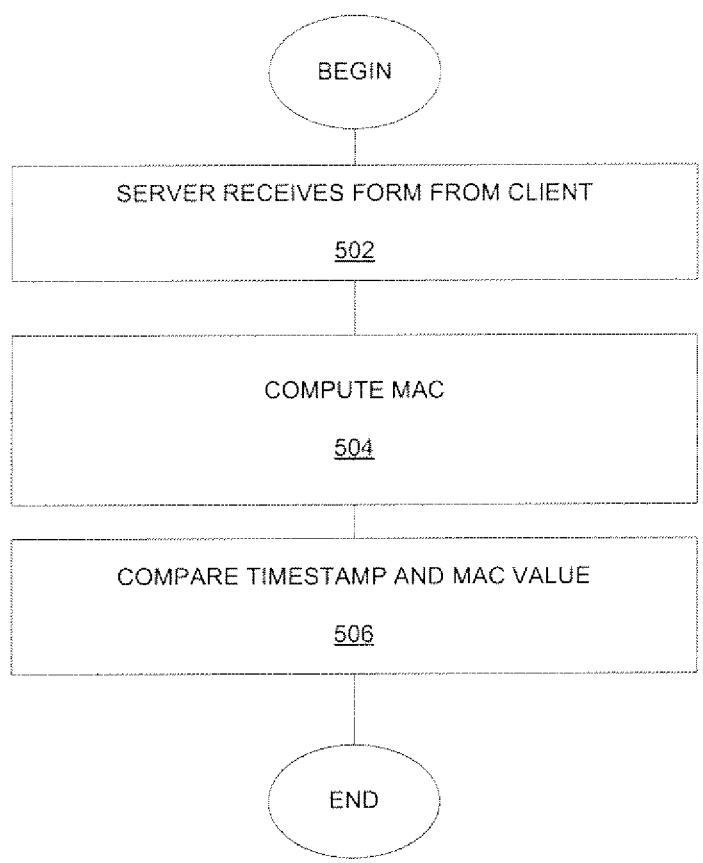
FIG. 5 is a flow diagram illustrating one embodiment of a method for preventing dynamic cross-site request forgery attacks at a client.

FIG. 5 is a flow diagram illustrating one embodiment of a method for preventing cross-site request forgery attacks. At 502, the server receives a completed form comprising a returned MAC value and a returned timestamp from the client. At 504, the server computes the MAC value. At 506, the server compares the original MAC value with the returned MAC value, and the original timestamp with the returned timestamp to validate the completed form.

In one embodiment, the user identifier token comprises a user name or a session token identifier. The request identifier token comprises a URL, a request type and account number, or an identifier that is uniquely associated with a particular requested action. The timestamp identifies a window of time in which the completed form is valid, the timestamp comprising a time at which the MAC value is computed, a last valid time for the completed form.

Figure 6:
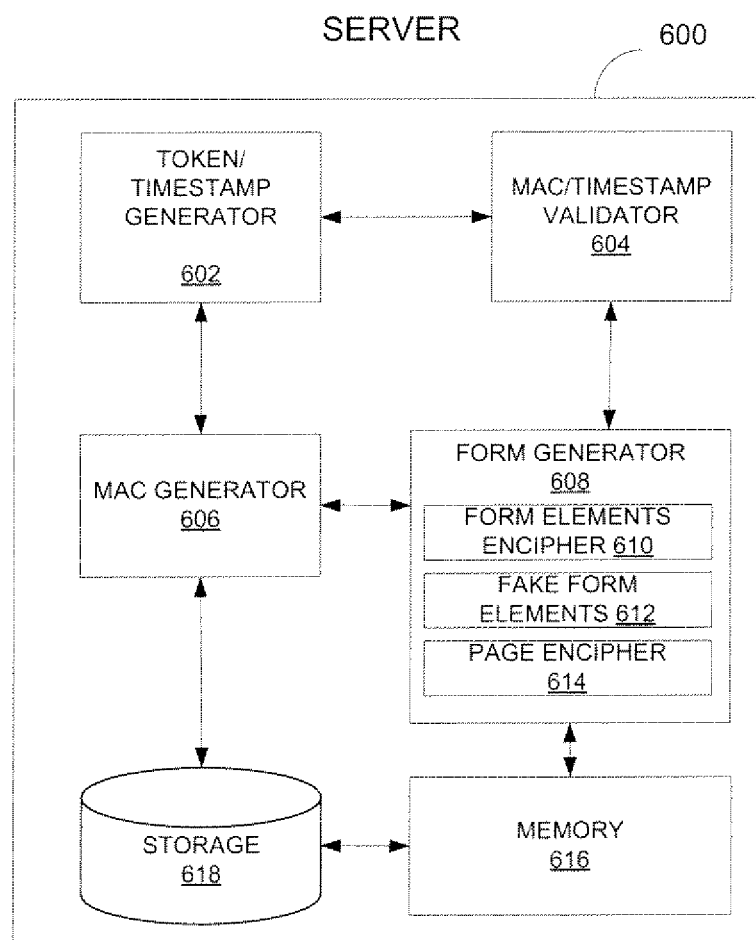
FIG. 6 is a block diagram illustrating one embodiment of a server for preventing dynamic cross-site request forgery attacks.

FIG. 6 is a block diagram illustrating one embodiment of a server 600 for preventing dynamic cross-site request forgery attacks. Server 600 includes a token and timestamp generator 602, a MAC value generator 606, a form generator 608, and MAC and timestamp validator 604, a data storage device 618, and a memory 616. The modules may embodied in one or more processing devices.

In one embodiment, form generator 608 includes a form element encipher module 610, a fake form elements module 612, and a page encipher module 614. The functionality of these modules were previously described above.

The storage device stores a secret key of a web application of server 500. Token and timestamp generator 502 generates a user identifier token, a request identifier token, and a timestamp. MAC generator 504 generates a MAC value based on the user identifier token, the request identifier token, and the timestamp using the secret key of the web application. Form generator 506 generates and sends the folio with the MAC value and the time stamp to the client. MAC value and timestamp validator 508 receives a completed form comprising a returned MAC value and a returned timestamp from the client and validates the completed form based on the returned MAC value and the returned timestamp.

Server 600 (also referred to as the machine) may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Memory 616 can include a read-only memory (ROM), flash memory, dynamic random access memory (DRAM) such as synchronous DRAM (SDRAM), or a static memory 606 (e.g., flash memory, static random access memory (SRAM), etc.).

Data storage device 618 may include a computer-accessible storage medium on which is stored one or more sets of instructions embodying any one or more of the methodologies or functions described herein. The software may also reside, completely or at least partially, within the main memory 616 and/or within the processing device during execution thereof by the computer system 600, the main memory 616 and the processing device also constituting computer-accessible storage media. The software may further be transmitted or received over a network via the network interface device.

While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   composing, by a processing device, a Message Authentication Code (MAC) value based on: a user identifier token that identifies a user of a web application hosted by a server, a request identifier token that identifies an action in the web application requested by the user, a timestamp, and a nonce corresponding to the action;
   enciphering a name of a form element of a form of the web application; and
   sending to a client the form having the enciphered name, the MAC value, and the timestamp.

2. The method of claim 1 further comprising:
   receiving, by the processing device, a completed form comprising a returned MAC value and a returned timestamp from the client; and
   validating, by the processing device, the completed form based on the returned MAC value and the returned timestamp.

3. The method of claim 2 further comprising:
   adding fake form elements to the form, wherein the fake form elements are invisible.

4. The method of claim 3 wherein the form is part of a page and, the method further comprises:
   enciphering the page; and
   providing to the client a JavaScript program to decipher the page and display the deciphered page.

5. The method of claim 4 wherein the request identifier token comprises a request type.

6. The method of claim 1 wherein the MAC value and the timestamp are in a hidden input field of the form.

7. A non-transitory computer-readable storage medium, having instructions stored thereon, that when executed by a processing device, cause the processing device to perform operations comprising:
   composing, by the processing device, a Message Authentication Code (MAC) value based on: a user identifier token, a request identifier token that identifies an action in the web application requested by the user, a timestamp, and a nonce corresponding to the action;
   enciphering a name of a form element of a form of the web application; and sending to a client the form having the enciphered name, the MAC value, and the timestamp.

8. The non-transitory computer-readable storage medium of claim 7, the operations further comprising:
receiving, by the processing device, a completed form comprising a returned MAC value and a returned timestamp from the client; and
validating, by the processing device, the completed form based on the returned MAC value and the returned timestamp.

9. The non-transitory computer-readable storage medium of claim 8, the operations further comprising:
adding fake form elements to the form, wherein the fake form elements are invisible.

10. The non-transitory computer-readable storage medium of claim 9 wherein the form is part of a page, and the operations further comprise:
enciphering the page; and
providing to the client a JavaScript program to decipher the page and display the deciphered page.

11. The non-transitory computer-readable storage medium of claim 8 wherein the timestamp identifies a window of time in which the completed form is valid.

12. The non-transitory computer-readable storage medium of claim 11 wherein the validating comprises:
comparing the MAC value with the returned MAC value; and
comparing the timestamp with the returned timestamp.

13. The non-transitory computer-readable storage medium of claim 12 wherein the MAC value and the timestamp are part of an action request URL.

14. A system, comprising:
a storage device to store a completed form; and
a processing device to:
compose a Message Authentication Code (MAC) value based on: a user identifier token that identifies a user of a web application hosted by a server, a request identifier token that identifies an action in the web application requested by the user, a timestamp, and a nonce corresponding to the action;
encipher a name of a form element of a form of the web application;
send to a client the form having the enciphered name, the MAC value, and the timestamp;
receive the completed form comprising a returned MAC value and a returned timestamp from the client; and
validate the completed form based on the returned MAC value and the returned timestamp.

15. The system of claim 14 wherein the processing device further adds fake form elements to the form, wherein the fake form elements are invisible.

16. The system of claim 15 wherein the form is part of a page, and wherein the processing device further:
enciphers the page, and
provides to the client a JavaScript program to decipher the page and display the deciphered page.

17. The system of claim 14 wherein the composing of the MAC value comprises concatenating the user identifier token, the request identifier token, and the timestamp.

18. The system of claim 17 wherein the validating comprises comparing the MAC value with the returned MAC value, and comparing the timestamp with the returned timestamp.

19. The system of claim 18 wherein the timestamp comprises one of a time when the MAC value is computed, and a last valid time for the completed form.

20. The method of claim 1 wherein the user identifier token comprises a session token identifier.

* * * * *